May 8, 1928.
W. L. LINDGREN
CLUTCH
1,669,256
Filed April 16, 1926
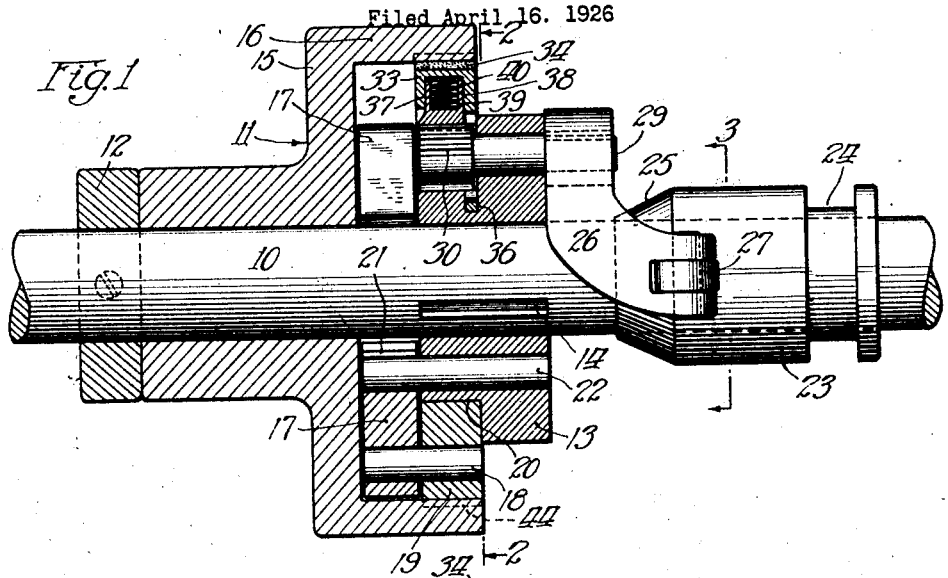
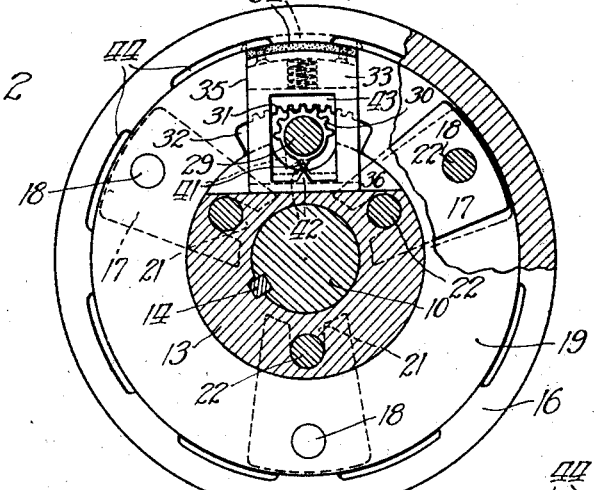
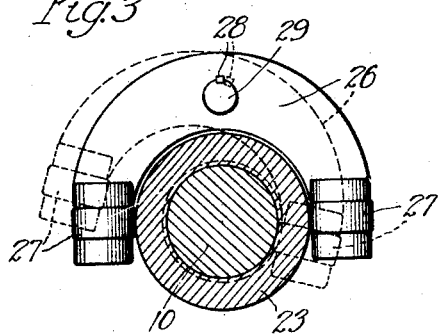
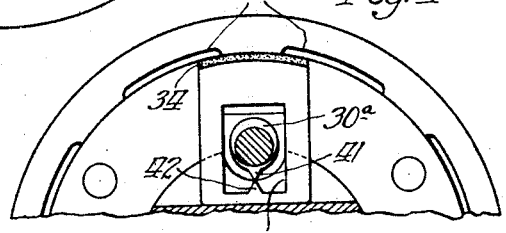
Inventor:
Waldemar L. Lindgren,
by John Howard McElroy
his Atty.

Patented May 8, 1928.

1,669,256

UNITED STATES PATENT OFFICE.

WALDEMAR L. LINDGREN, OF CHICAGO, ILLINOIS, ASSIGNOR TO ALFRED A. NORTON, TRUSTEE, OF CHICAGO, ILLINOIS.

CLUTCH.

Application filed April 16, 1926. Serial No. 102,369.

My invention is concerned with automatic clutches to connect rotating members, and it is designed to produce a device of the class described that shall be simple in its construction yet effective in its operation, and which shall not require extreme accuracy in its construction.

This invention is intended primarily as an improvement upon the clutch shown in my Patent No. 1,472,480, granted October 30, 1923, although in some of its features it is capable of a more general application.

To illustrate my invention, I annex hereto a sheet of drawings, in which the same reference characters are used to designate identical parts in all the figures, in which—

Fig. 1 is a central vertical section through a clutch embodying my invention;

Fig. 2 is an elevation in section on the line 2—2 of Fig. 1;

Fig. 3 is a similar view on the section line 3—3 of Fig. 1; and

Fig. 4 is a fragmentary view on the same plane as Fig. 2, but illustrating a modified construction.

In the specific application of my invention illustrated, 10 is the driving shaft or member, having mounted thereon the driven member 11, free to rotate thereon, but held from longitudinal movement by the collar 12 pinned to the shaft, and another collar 13 rigidly secured on the shaft, as by the spline 14. The driven member 11 is illustrated as consisting of a hub portion and the cup portion consisting of the disc 15 and the annular flange 16, although it will be understood that it is not limited to any specific form of driven mechanism, except that it must have an annular flange, such as 16, secured to rotate therewith. For the clutching mechanism proper, I preferably employ three short levers or clutch dogs 17 fulcrumed by the pins 18, on a ring 19, preferably within the flange 16, and preferably free to rotate slightly on the annular bearing surface 20 formed by reducing the diameter of the inner end of the collar or sleeve 13. The inner ends of the dogs 17 are recessed, as at 21, to receive the pins 22 secured in the collar 13. The outer ends of the clutch dogs are eccentric to their fulcrums 18, although concentric with the inner periphery of the flange 16, so that if, with the parts at rest, the shaft 10 starts to rotate in either direction, the pins 22, swinging the dogs 17 on their fulcrums 18 will cause their ends to grip the inner periphery of the flange 16 to compel the driven member to rotate with the driving member so long as the clutch elements remain in their relatively displaced positions. When they are brought back to their normal position, with the pins 18 and 22 in radial alinement, the dogs will unclutch and the driven member can stop its rotation. To thus unclutch it, I provide the following mechanism, which constitutes the novelty of my present invention:

Upon the shaft 10 I mount the sliding sleeve 23, preferably provided with the annular groove 24 to receive the forked end (not shown) of the customary shipper lever, and having the tapered end 25 to cooperate with the ends of the fork 26, the contact surfaces of said ends being preferably provided by the peripheries of anti-friction rollers 27 journaled in said ends. The fork 26 is secured, as by the spline 28, on the end of a rock shaft 29 journaled in a bearing formed in the collar 13, and having on the inner end thereof either the mutilated pinion 30, as seen in Figs. 1 and 2, or the eccentric disc 30ª, as seen in Fig. 4. Where the mutilated pinion 30 is employed, its teeth mesh with the teeth 31 formed on the curved outer side of a recess 32 formed in the ring 19. A brake shoe 33 having the preferably leather contact surface 34 on its outer end is mounted to slide in a radially extending bearing recess 35 formed in the ring 19 supplemented by the narrow, secant-shaped recess 36 formed in the reduced portion of the collar 13, the inner end of the brake shoe being thin enough to fit in the recess 36, while its wider outer end extends entirely to the outer end of the recess 35, which outer end of the recess extends entirely through the outer portion of the ring 19. A trough shaped recess 37 formed in the thicker outer end of the shoe 33 receives the complementary portion 38 of the ring 19, which complementary portion has therein the recess 39 to receive the helically coiled expanding spring 40, which co-acts with the bottoms of the recesses 37 and 39 to force the brake shoe 33 outwardly to contact with the inner periphery of the annular flange 16 when such movement is permitted. This movement is controlled by a triangular lug 41, formed on the under side of the pinion 30 or the eccentric 30ª, as the case may be, cooperating with a similar lug 42 projecting up from the bottom of the rectangular aperture 43 formed in the lower part of the shoe 33 to permit the rock shaft 29 to extend therethrough. The inner periphery of the annular flange 16 may have the shallow recesses 44 therein to cooperate with the portion 34 of the brake shoe 33, as explained in my Patent No. 1,587,532, issued June 8, 1926, where this feature is shown and claimed.

The operation of my improved unclutching mechanism is as follows: When the parts are clutched together, the yoke 26 is swung to one side, as indicated in dotted lines in Fig. 3, because the ring 19 is so shifted relative to the sleeve 13 by the turning of the dogs 17 from their radial position in the clutching movement. This brings the lugs 41 and 42 out of alinement so as to permit the shoe 33 to move outward by the action of the spring 40 and have its end 34 engage one of the recesses 44, when they are employed, as indicated in dotted lines in Figs. 2 and 4. So long as the clutch is acting, the parts remain as indicated in dotted lines. When the driven member is to be stopped, the shipper lever (not shown) or other actuating means for the sleeve 23 is operated to bring it to the position shown in full lines in Figs. 1 and 3, where the tapered portion 25 acting on the rollers 27 has rocked the shaft 29 to bring the parts into the position shown in full lines in Figs. 2 and 3, the movement of the ring 19 relative to the sleeve 13 being effected by the action of the gear pinion 30 on the teeth 31 in the form shown in Fig. 2, and by the action of the cam 30ª on the sides of the recess 43, in the form shown in Fig. 4. The inclined sides of the lug 41 acting against the inclined sides of the lug 42 during this relative movement, cams the shoe 33 inward to disengage the end 34 of the shoe from the inner periphery of the annular flange 16, and thus completes the unclutching of the device. It will be noted that the ring 19 is thus moved positively to bring the dogs 17 into radial position and the shoe 33 is likewise drawn in by a positive action during the unclutching movement.

While I have shown and described my invention as embodied in the form which I at present consider the best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is—

1. In a clutch, the combination with a rotating driving member, of a driven member concentric therewith and including an annular flange, a ring mounted to rotate with the driving member but capable of slight angular displacement relative thereto, a plurality of clutch dogs pivoted on the ring and having their outer ends adjacent the inner periphery of the annular flange, connections between the dogs and the driving member to swing them to clutching position by relative movement of the driving member and the ring, a spring-pressed brake member carried by the ring and adapted to engage the inner periphery of the annular flange when free to do so, a rock shaft carried by the driving member and parallel to the axis thereof, connections between the rock shaft and the ring whereby the movement of the ring relative to the driving member during the clutching action rocks the shaft, and the rocking back of the shaft moves the ring back to unclutch, and means to rock the shaft back.

2. In a clutch, the combination with a rotating driving member, of a driven member concentric therewith and including an annular flange, a ring mounted to rotate with the driving member but capable of slight angular displacement relative thereto, a plurality of clutch dogs pivoted on the ring and having their outer ends adjacent the inner periphery of the annular flange, connections between the dogs and the driving member to swing them to clutching position by relative movement of the driving member and the ring, a spring-pressed brake member carried by the ring and adapted to engage the inner periphery of the annular flange when free to do so, a rock shaft carried by the driving member and parallel to the axis thereof, connections between the rock shaft and the ring whereby the movement of the ring relative to the driving member during the clutching action rocks the shaft, and the rocking back of the shaft moves the ring back to unclutch, a sleeve having a tapered end slidable along the axis of the driving member, and a fork carried by the rock shaft having its ends cooperating with the tapered end of the sleeve.

3. In a clutch, the combination with a rotating driving member, of a driven member concentric therewith and including an annular flange, a ring mounted to rotate with the driving member but capable of slight angular displacement relative thereto, a plurality of clutch dogs pivoted on the ring and having their outer ends adjacent the inner periphery of the annular flange, connections between the dogs and the driving member to swing them to clutching position by relative movement of the driving member and the ring, a spring-pressed brake member carried by the ring and adapted to engage the inner periphery of the annular flange when free to do so, a rock shaft carried by the driving member and parallel to the axis thereof, cooperating engaging surfaces carried by the rock shaft and ring whereby the movement of the ring relative to the driving member during the clutching action rocks the shaft, and the rocking back of the shaft moves the ring back to unclutch, and means to rock the shaft back.

4. In a clutch, the combination with a rotating driving member, of a driven member concentric therewith and including an annular flange, a ring mounted to rotate with the driving member but capable of slight angular displacement relative thereto, a plurality of clutch dogs pivoted on the ring and having their outer ends adjacent the inner periphery of the annular flange, connections between the dogs and the driving member to swing them to clutching position by relative movement of the driving member and the ring, a spring-pressed brake member carried by the ring and adapted to engage the inner periphery of the annular flange when free to do so, a rock shaft carried by the driving member and parallel to the axis thereof, cooperating engaging surfaces carried by the rock shaft and ring whereby the movement of the ring relative to the driving member during the clutching action rocks the shaft, and the rocking back of the shaft moves the ring back to unclutch, cooperating cam surfaces carried by the rock shaft and the brake member to withdraw the brake member as the shaft is rocked back, and means to rock the shaft back.

5. In a clutch, the combination with a rotating driving member, of a driven member concentric therewith and including an annular flange, a ring mounted to rotate with the driving member but capable of slight angular displacement relative thereto, a plurality of clutch dogs pivoted on the ring and having their outer ends adjacent the inner periphery of the annular flange, connections between the dogs and the driving member to swing them to clutching position by relative movement of the driving member and the ring, a spring-pressed brake member carried by the ring and adapted to engage the inner periphery of the annular flange when free to do so, a rock shaft carried by the driving member and parallel to the axis thereof, connections between the rock shaft and the ring whereby the movement of the ring relative to the driving member during the clutching action rocks the shaft, and the rocking back of the shaft moves the ring back to unclutch and withdraws the brake member, and means to rock the shaft back.

6. In a clutch, the combination with a rotating driving member, of a driven member concentric therewith and including an annular flange, a ring mounted to rotate with the driving member but capable of slight angular displacement relative thereto, a plurality of clutch dogs pivoted on the ring and having their outer ends adjacent the inner periphery of the annular flange, connections between the dogs and the driving member to swing them to clutching position by relative movement of the driving member and the ring, a rock shaft carried by the driving member and parallel to the axis thereof, connections between the rock shaft and the ring whereby the movement of the ring relative to the driving member during the clutching action rocks the shaft, and the rocking back of the shaft moves the ring back to unclutch, and means to rock the shaft back.

7. In a clutch, the combination with a rotating driving member, of a driven member concentric therewith and including an annular flange, a ring mounted to rotate with the driving member but capable of slight angular displacement relative thereto, a plurality of clutch dogs pivoted on the ring and having their outer ends adjacent the inner periphery of the annular flange, connections between the dogs and the driving member to swing them to clutching position by relative movement of the driving member and the ring, a rock shaft carried by the driving member and parallel to the axis thereof, cooperating engaging surfaces carried by the rock shaft and the ring whereby the movement of the ring relative to the driving member during the clutching action rocks the shaft, and the rocking back of the shaft moves the ring back to unclutch, and means to rock the shaft back.

In witness whereof, I have hereunto set my hand this 10th day of April, 1926.

WALDEMAR L. LINDGREN.